D. L. LINDQUIST & D. LARSON.
MECHANICAL CONTROLLER FOR ELECTRIC CURRENTS.
APPLICATION FILED OCT. 30, 1907.

967,398.

Patented Aug. 16, 1910.

WITNESSES:
James G. Bethell
Ernest L. Gale Jr.

INVENTORS
David L. Lindquist
David Larson
BY
C. M. ______
ATTORNEY

D. L. LINDQUIST & D. LARSON.
MECHANICAL CONTROLLER FOR ELECTRIC CURRENTS.
APPLICATION FILED OCT. 30, 1907.

967,398.

Patented Aug. 16, 1910.
6 SHEETS—SHEET 3.

Fig. 4.

WITNESSES:
James G. Bethell
Ernest L. Gale Jr.

INVENTORS
David L. Lindquist
David Larson
BY
C. M. Nissen
ATTORNEY

D. L. LINDQUIST & D. LARSON.
MECHANICAL CONTROLLER FOR ELECTRIC CURRENTS.
APPLICATION FILED OCT. 30, 1907.

967,398.

Patented Aug. 16, 1910.
6 SHEETS—SHEET 5.

CENTER POSITION

FIRST POSITION

SECOND POSITION

THIRD POSITION

WITNESSES:
James G. Bethell
Ernest L. Gale Jr.

INVENTORS
David L. Lindquist
David Larson
BY
C. M. Nissen
ATTORNEY

UNITED STATES PATENT OFFICE.

DAVID L. LINDQUIST AND DAVID LARSON, OF YONKERS, NEW YORK, ASSIGNORS TO OTIS ELEVATOR COMPANY, OF JERSEY CITY, NEW JERSEY, A CORPORATION OF NEW JERSEY.

MECHANICAL CONTROLLER FOR ELECTRIC CURRENTS.

967,398. Specification of Letters Patent. Patented Aug. 16, 1910.

Application filed October 30, 1907. Serial No. 399,969.

*To all whom it may concern:*

Be it known that we, DAVID L. LINDQUIST and DAVID LARSON, residing at Yonkers, in the county of Westchester and State of New York, have invented a new and useful Improvement in Mechanical Controllers for Electric Currents, of which the following is a specification.

Our invention relates to motor-controlling apparatus, and one of its objects is the provision of improved, simple and efficient means for mechanically operating circuits and connections of such apparatus.

Although our invention is particularly adapted to hand rope control alternating current elevators, it may have a general application.

Other objects of the invention will appear hereinafter, the novel combinations of elements being set forth in the appended claims.

In the accompanying drawings

Figure 10:
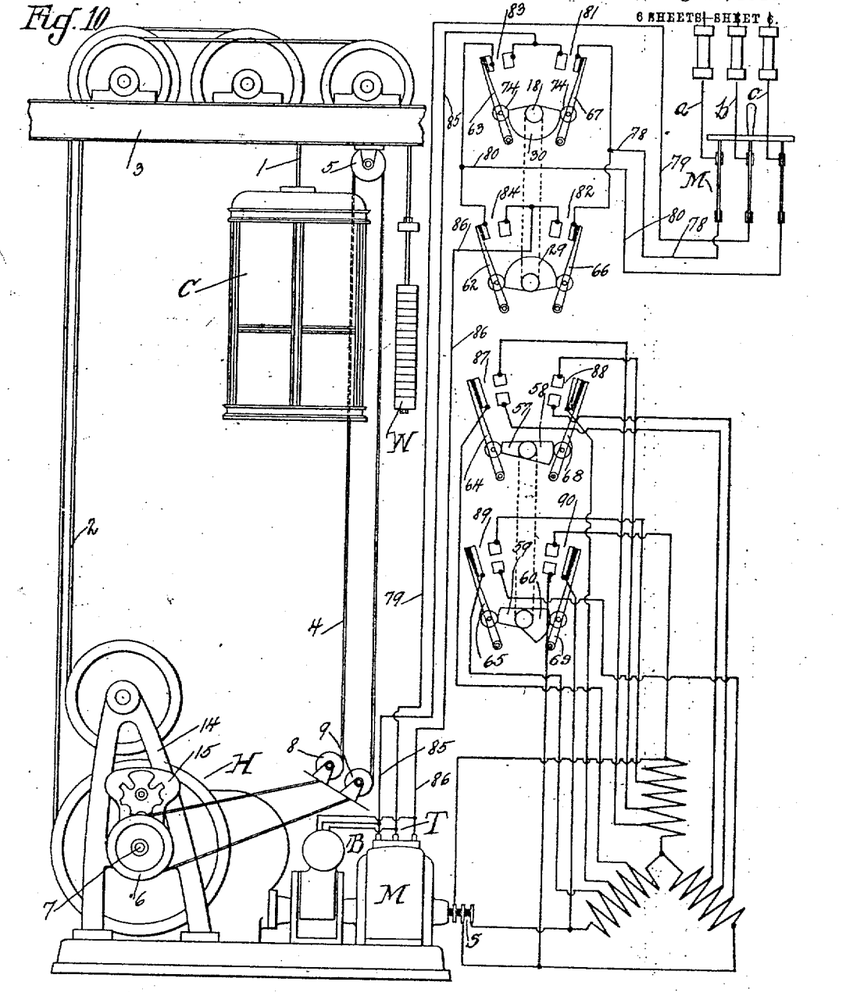
Fig. 10 represents diagrammatically a hand rope controlled elevator operated by an alternating current motor with our invention applied thereto.

In Fig. 10, C represents a car which is connected by the hoisting cables 1 to the hoisting apparatus H, which may be connected in the usual manner to an electric motor M which in this instance is designed to be operated by alternating current. B represents brake mechanism which may be operated in any desired manner. W is a counterweight connected by the cables 2 to the drum of the hoisting apparatus H. Direction sheaves on the overhead fixed beam 3 receive the hoisting and counterweight cables. Extending through the car C is a hand rope 4 which is connected between the sheave 5 mounted on the fixed beam 3 and the shipper sheave 6 mounted loosely on the drum shaft 7. In this instance we have also shown direction sheaves 8 and 9 mounted in position to properly deflect the endless hand rope 4 so that the portion extending through the car will be substantially vertical. These parts may be constructed and arranged in the usual manner.

Figure 3:
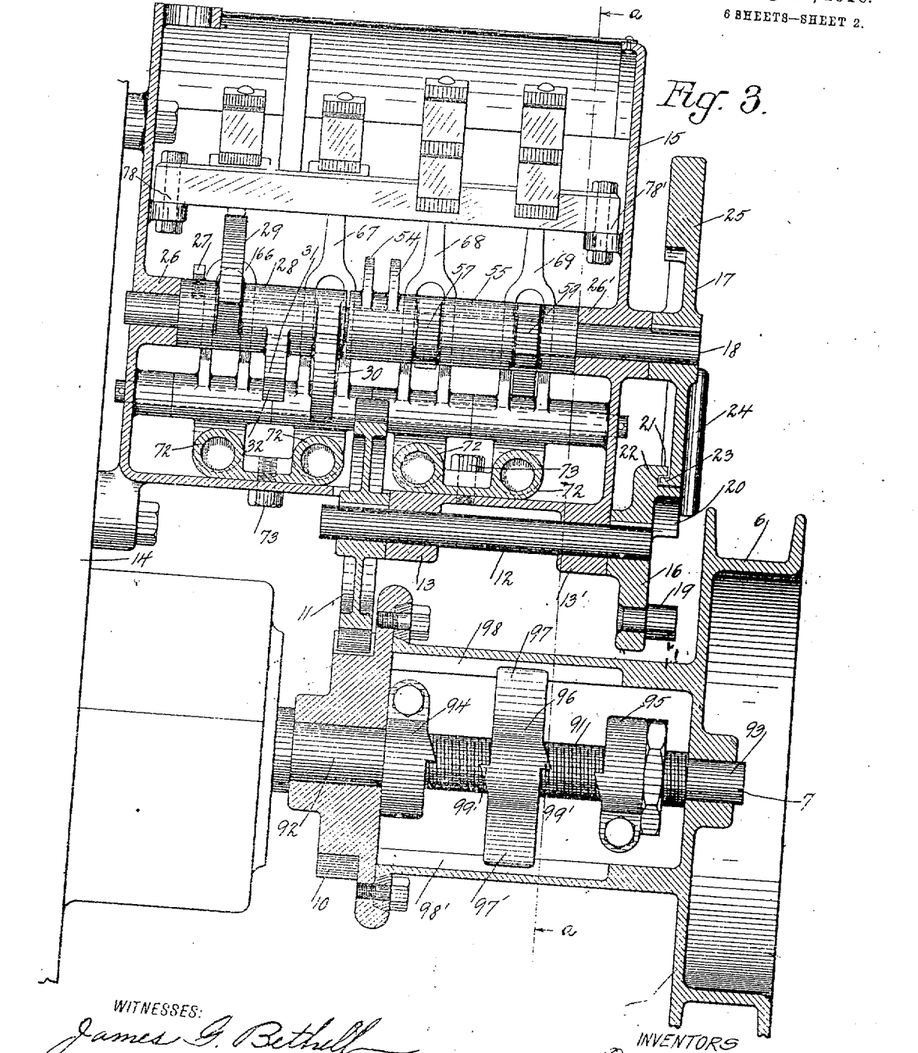
Fig. 3 is a sectional elevation taken longitudinally through the main shaft of Fig. 1.
Figure 4:
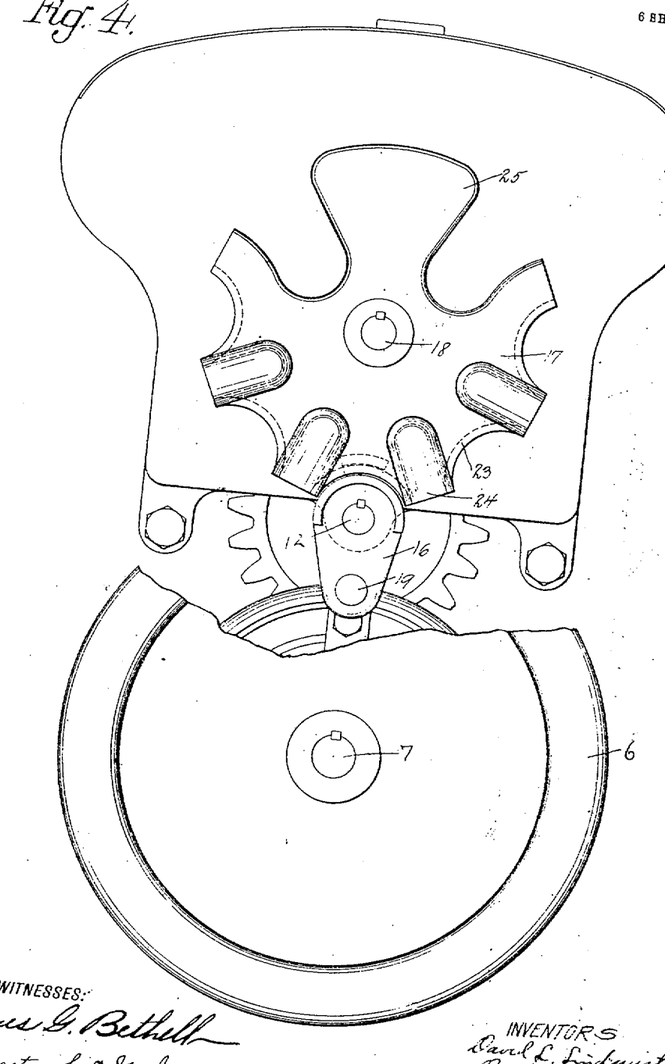
Fig. 4 is an elevational view of the right-hand end of Fig. 1 or Fig. 3.

Referring now to Fig. 3, it will be seen that the shipper sheave 6 mounted loosely on the drum shaft 7 carries at its opposite end a gear wheel 10 which is in mesh with the gear 11 keyed to the countershaft 12 at one end of the latter. This shaft is journaled in the bearings 13, 13' of a fixed support attached to the frame 14 of the hoisting apparatus. In this instance these bearings are connected to the casing 15 which incloses the cam mechanism hereinafter described. At the other end of the countershaft 12 is keyed a Geneva lever 16 which coöperates with the intermittent switch segment 17 to intermittently actuate and partially rotate the cam shaft 18. The Geneva lever 16 comprises a lateral cylindrical projection 19 at one end and an arc-shaped laterally projecting segment 20 at its other end. Said other end also has formed thereon a corresponding arc-shaped segment 21 of smaller dimensions, but spaced from the segment 20 to form an arc-shaped recess 22 to fit over the inwardly projecting arc-shaped projections 23 on the outer portion of the switch segment 17. Between these lateral arc-shaped projections 23 are pockets 24 for receiving the cylindrical projection 19 which slides along in the same while moving the switch segment 17 a predetermined distance. The Geneva lever and switch segment are so arranged with respect to each other that when the shipper sheave 6 is rotated and motion is transmitted to said lever through the gears 10, 11 and the shaft 12, the segments 20, 21 will simply slide over the projection 23 without transmitting any motion to the segment 17. After the shaft 12 is rotated a sufficient distance for the lug 19 to move into one of the pockets 24, the said lug will slide along in the same and transmit motion to the segment 17 until the lug 19 is again moved out of the pocket. The projections 20 and 21, with the recess 22 fitting over the reversely arranged projection 23, serve as a locking device for holding the segment 17 in the position in which it has been placed by the lug 19 moving into and out of one of the pockets 24. The upper portion 25 of the segment 17, as viewed in Figs. 3 and 4, is a weight to counterbalance the lower portion of the segment so as to facilitate the holding of the segment in the position in which it has been placed.

The shaft 18 is keyed to the segment 17 so as to rotate therewith and is journaled in fixed bearings 26, 26' which are shown in this instance as integral with the casing 15. Connected to the inner end of the shaft 18, as by means of a set-screw 27, is a cam sleeve 28 which carries the reversing switch cams 29 and 30 and the dash-pot cam 31. As shown in Fig. 10 the cams 29 and 30 are approximately semi-circular, the cam 29 being initially on the upper side of the shaft 18 and the cam 30 on the lower side thereof. The dash-pot cam 31 is also on the lower side of the shaft 18 and is preferably provided with recesses 32, shown best in Fig. 5.

Figures 1, 2:
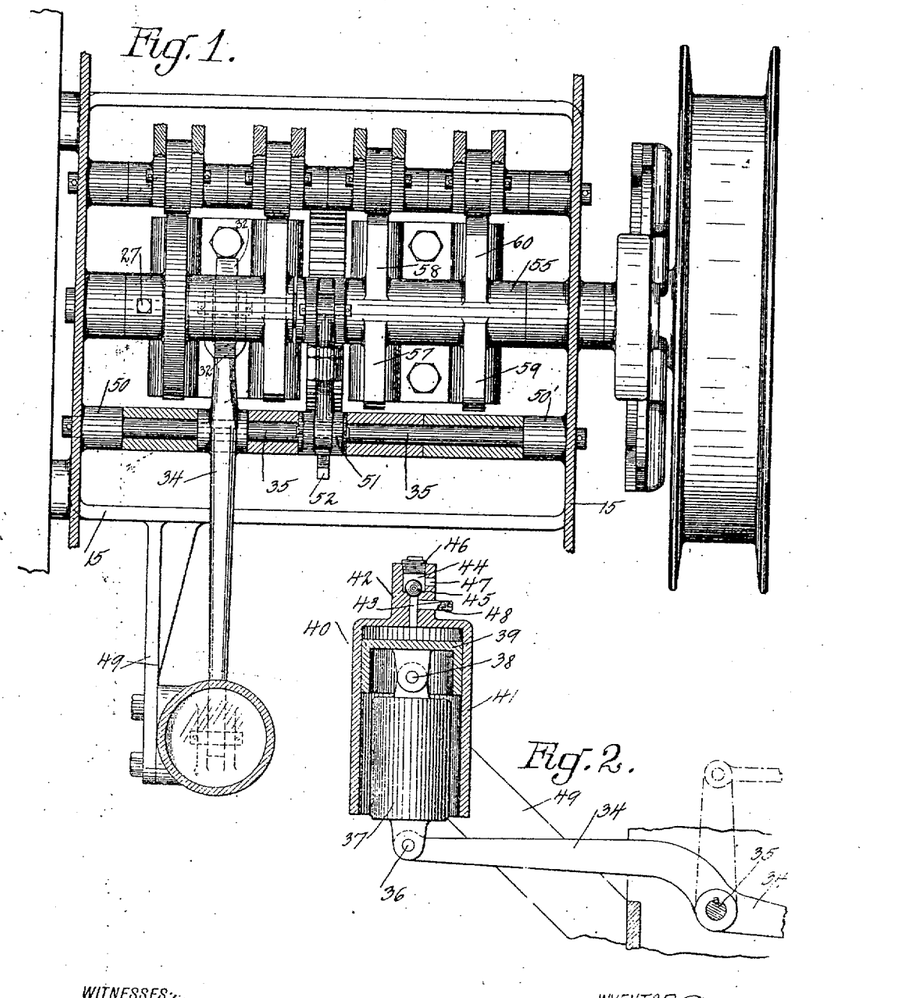
Figure 1 represents a plan view of a unitary construction for mechanically operating the reversing switches and accelerating switches of an alternating current or direct current motor.
Fig. 2 represents in sectional elevation a fragmentary view of the dash-pot and connections shown in plan Fig. 1.

In engagement with the lower portion of the cam 31 is the anti-friction roller 33 pivoted to the inner end of the lever 34 which is keyed to the shaft 35 intermediate its ends. The outer end of the lever 34 is pivoted at 36 to a weight 37 which in turn is pivoted at 38 to the piston 39 of the dash-pot 40. Normally the piston 39 is at or near the upper end of the dash-pot cylinder 41 which is open at its lower end to permit free movement of the weight 37 therein. The upper side of the dash-pot cylinder 41 is provided with means for permitting free egress of the air from above the piston 39 when the latter is moved upwardly, and with automatic means for retarding the piston in its movement downwardly. In this instance we have shown an upwardly extending neck 42 provided with a passageway 43 extending vertically to the recess 44 in which is placed a ball 45. This recess is closed by a screw-threaded cap 46 and communicates with the atmosphere through an opening 47. The passageway 43 communicates with the atmosphere through a restricted opening controlled by the slotted valve 48. When the ball 45 seats itself in its lower position, as shown in Fig. 2, the air must pass into the cylinder 41 through the lateral opening controlled by the valve 48, but when the piston 39 is forced upwardly the ball 45 is unseated and there is free escape of the air through the opening 47.

We have shown the dash-pot cylinder 41 connected to a bracket 49 which extends laterally from a fixed support such as the casing 15.

The shaft 35 which is connected to rotate with the dash-pot lever 34 is journaled in bearings 50, 50' which may be integral with the casing 15. At a short distance from the lever 34 in a plane substantially parallel with the lever 34 is an arm 51 connected by a set-screw 52 to the shaft 35 so as also to rotate with the latter. The upper end of this arm 51 is in this instance bifurcated to provide a pivotal connection at 52' for the link 53, the other end of which is connected pivotally to the upper ends of the two arms 54 which are connected to rotate with the reversing switch cam sleeve 55. In this instance we have shown the arms 54, between which the inner end of the link 53 is connected, as integral with the sleeve 55. The length of the link 53 may be adjusted by the interlocking nuts 56. The position of the arm 51 on the shaft 35 may be adjusted by the set-screw 52.

The sleeve 55 carries, in addition to the arms 54, a plurality of cams arranged so as to effect the successive operation of accelerating switches to gradually cut out the starting resistance of an electric motor. In this instance we have shown four cam levers 57, 58, 59 and 60 mounted on the sleeve 55. This sleeve is mounted loosely on the shaft 18 so that when the latter is rotated no motion is transmitted directly to said sleeve. This sleeve is arranged to be operated only by the weight 37 when the latter is released by moving the cam 31 out of the way of the inner end of the lever 34.

Figure 5:
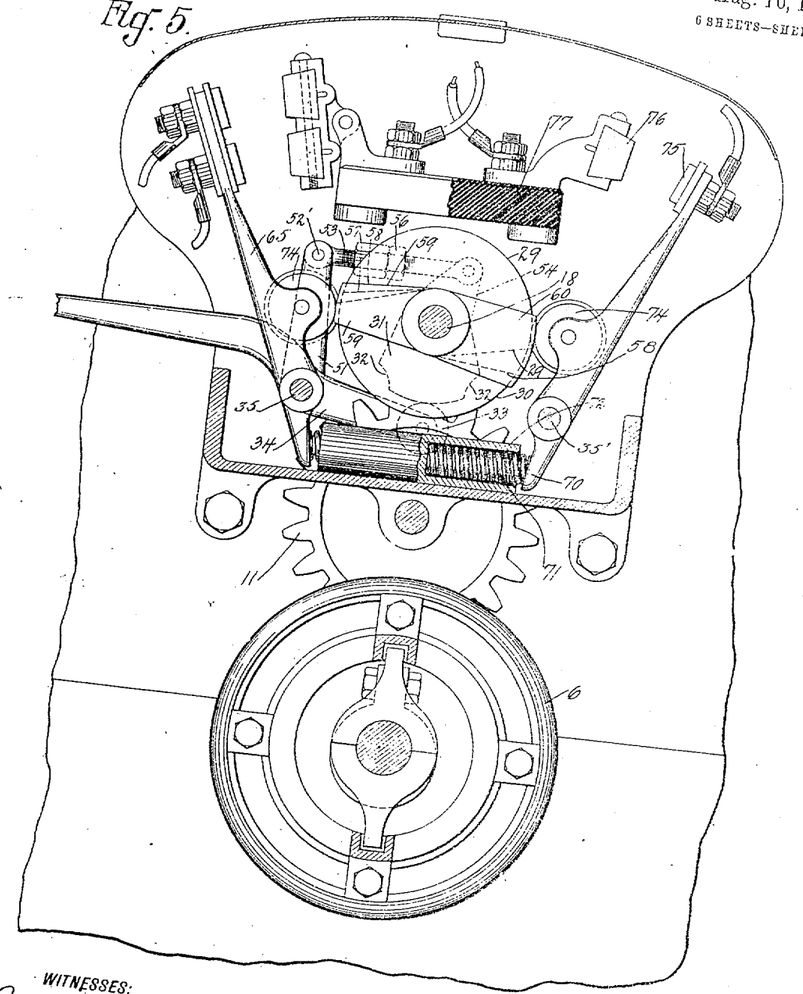
Fig. 5 is a sectional elevation of Fig. 3 on the line $a$—$a$ and looking in the direction of the arrows, but omitting two of the accelerating switches. Figs. $6^a$, $6^b$, $6^c$, $6^d$, $7^a$, $7^b$, $7^c$, $7^d$, $8^a$, $8^b$, $8^c$, $8^d$, $9^a$, $9^b$, $9^c$, $9^d$ represent in detail the various positions of the separate switches during the operation of the mechanical controller.

Referring now particularly to Fig. 5, the electric switch mechanism will be described. Journaled in the casing are two parallel shafts or bearing rods 35 and 35' which carry the switch levers 62, 63, 64, 65 and 66, 67, 68, 69. The lower ends 70 of these respective levers engage springs 71 mounted in recesses 72 which are fixed to the bottom of the casing 15, as by means of bolts 73 as indicated in Fig. 3. These springs normally urge the switch levers to circuit-closing position, but are prevented from doing so by the rollers 74 mounted thereon engaging the various reversing switch and accelerating cams. At the upper ends of the switch levers are contacts 75 facing fixed contacts 76 which are mounted on an insulating support 77 connected rigidly at 78, 78' to the inner end walls of the casing 15. Normally all the electric switches are open, but when the reversing switch cam sleeve 28 is rotated the cams 29 and 30 will each release one of the reversing switch levers to effect the closing of the main line circuit to the motor in a predetermined direction. At the same time the dash-pot cam will be released to permit the weight 37 to transmit motion to the accelerating cam sleeve 55, when the cams thereon will successively release the switch levers controlled thereby to effect the automatic movement of the accelerating switch levers.

Figure 6A:
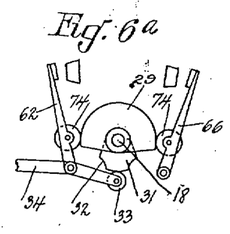
Figures 6B, 6C:
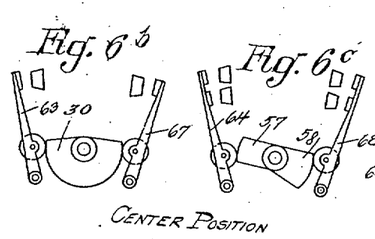
Figures 6D, 7D:
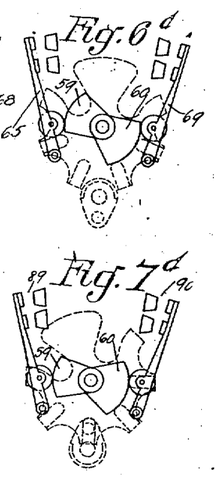
Figure 7A:
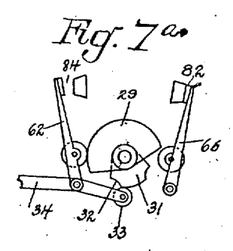
Figure 7B:
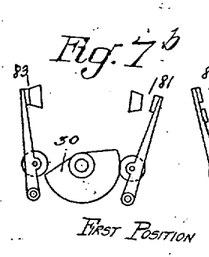
Figure 7C:
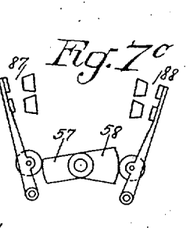

Figs. 6ª, 6ᵇ, 6ᶜ, 6ᵈ, 7ª, 7ᵇ, 7ᶜ, 7ᵈ, 8ª, 8ᵇ, 8ᶜ, 8ᵈ, 9ª, 9ᵇ, 9ᶜ, 9ᵈ represent the various positions of the cams and switches during the operation of the controlling device, these figures representing respectively a normal or central position, first position, second position and third position. In the central position all the switches are open and no current can flow to the motor. When the hand rope 4 is actuated, however, so as to rotate the shipper sheave 6, motion will be transmitted to the shaft 18 and thence to the cams 29, 30 and 31. If it is assumed that the shaft 18 is rotated in a counter-clockwise direction, as viewed from the right-hand position in Fig. 1, then the cams 29 and 30 will be moved to the positions indicated in Figs. 7ª and 7ᵇ to permit the switches 82 and 83 to be closed while the switches 87, 88, 89 and 90 of the accelerating mechanism are still held open.

Upon referring to Fig. 10 it will be seen that when the switches 82 and 83 are closed, circuits will be established from the main line conductors a, b and c leading from a suitable source of alternating current supply, through the three-pole switch M, and thence to the motor terminals T. The motor and the circuits therefor are shown in this instance as three-phase, and the respective circuits may be traced as follows: from the main a through the conductor 78, switch 82, conductor 86 to the stator of the motor; from the main b through the conductor 79 directly to the stator; and from main c through the conductor 80, switch 83, and conductor 85 to another stator terminal. By reversing the connection of the mains a and c of the motor terminals, the motor may be reversed. This can be accomplished by rotating the shaft 18 in the opposite direction so that the switches 81 and 84 will be permitted to be closed automatically by the springs 71 instead of the switches 82 and 83.

Upon the closing of the switches 82 and 83 the motor will receive current so that it may start, the brake apparatus B being released when the reversing switch mechanism is operated. The speed of the motor is limited by the starting resistance which is connected to the rotor, or secondary, of the motor through the slip rings S, and in this instance is shown star-connected and sectional. The sections of the starting resistance are connected to the accelerating switches 87, 88, 89 and 90 which are respectively controlled by the cams 57, 58, 59 and 60. These cams normally hold the switches in open position and are so shaped that when the sleeve 55 is rotated they will successively release the levers 64, 68, 65 and 69 to permit the springs 71 to automatically close the accelerating switches mentioned.

Figure 8A:
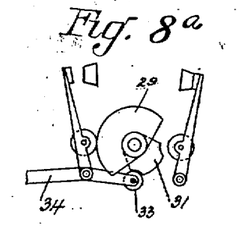
Figures 8B, 8C:
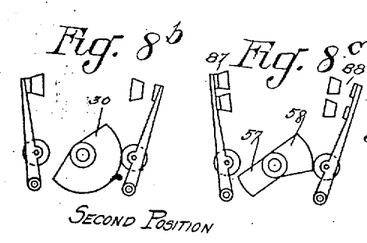
Figure 8D:
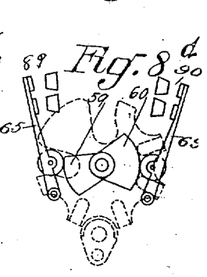
Figure 9A:
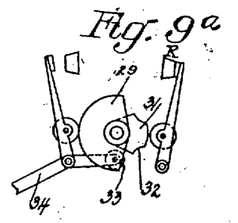
Figure 9B:
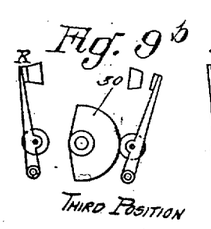
Figure 9C:
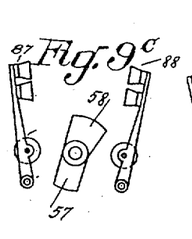
Figure 9D:
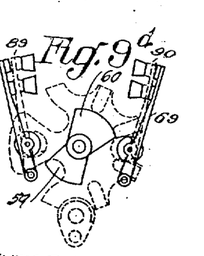

In Figs. 8ª, 8ᵇ, 8ᶜ and 8ᵈ the positions of the various cams are illustrated when the shipper sheave has been moved to a position next preceding the limit of its intended travel where the roller 33 moves into one of the recesses 32 of the dash-pot cam plate 31. The dash-pot lever 34 will thereupon be released sufficiently to permit the weight 37 to actuate the lever 34 and partially rotate the shaft 35 to transmit rotary motion to the accelerating cam sleeve 55. This motion is regulated by the dash-pot 40, but cannot be varied by changing the speed of rotation of the shipper sheave 6. In Fig. 8ᶜ the cam 57 is shown in a position to which it has been brought by further movement of the cam 31 to free the lever 34, thus permitting the switch 87 to close and cut out the central section of the starting resistance R. At this time the switches 88, 89 and 90 are still held open. Upon further rotation of the sleeve 55 the switch 88 is permitted to be closed to cut out the next adjacent intermediate sections of the starting resistance R. The next step in the operation is the release of the lever 65 by the cam 59, when the switch 89 will be closed to cut out additional sections of the starting resistance. The final step is the cutting out of the remaining portions of the starting resistance by the closure of the switch 90, due to the release of the lever 69 by the cam 60. These fourth and fifth positions are not illustrated in the drawings, but the switches 89 and 90 are shown in Fig. 9ᵈ in closed position in dotted lines. Obviously the number of steps may be varied as desired, the important advantages being that the switches are operated to closed position without the use of electro-magnets and the speed of their successive operation of the last three switches is entirely independent of the operator in the car. This enables the acceleration to be adjusted beforehand, so that danger of the starting resistance being cut out too rapidly may be avoided.

It should be noted that by reason of the intermittent actuating mechanism the position of the cam mechanism for controlling the reversing switch is held, for a short space of time at least, as indicated in Fig. 7ª. If the hand rope is actuated a sufficient distance to move the rotary cam device controlling the reversing switch so that current will be admitted to the motor, the latter may be operated at slow speed if the hand rope is stopped in this position. If the hand rope is operated continuously and slowly the motor will receive current an appreciable space of time before the Geneva lever will again actuate the intermittent switch segment to bring the reversing switch cam device to the position shown in Fig. 8ª, where the roller 35 is permitted to move into one of the recesses 32.

When the hand rope is moved in the reverse direction to restore the switch apparatus to normal or initial position, positive actuation is transmitted through the cam 31 and the lever 34 to the accelerating cam sleeve 55. The starting resistance is therefore automatically re-inserted step by step at a rate depending upon the speed with which the hand rope is moved. The lever 34 may be moved in this manner positively to its initial position without being retarded by the dash-pot, as the resistance at this point is almost entirely removed at the check valve past which the air is now permitted to flow freely. The reversing switch is, however, not immediately opened, by reason of the intermittent actuating connection between the manual apparatus and the reversing switch cam device. After the starting resistance has been re-inserted the motor still operates at slow speed while the cams assume the positions shown in Figs. 7ª, 7ᵇ, 7ᶜ, 7ᵈ. Upon the next rotation of the Geneva lever the reversing switch cam device is brought back to its initial position as shown in Figs. 6ª, 6ᵇ, 6ᶜ, 6ᵈ.

In order to stop the motor when the car reaches either limit of its travel, stop-motion mechanism is connected to the shipper sheave as shown in Figs. 3 and 5. In this instance we have shown the extended portion of the drum shaft 7 screw-threaded at 91 between the journals 92 and 93 on which the shipper sheave frame rotates. 94 and 95 are stops clamped to the screw-threaded portion 91 so as to rotate therewith. Intermediate these stops is a traveling nut 96 with wing portions 97 and 97' continually in engagement with the connecting members 98, 98', respectively, of the shipper sheave frame so as to guide the traveling nut in a longitudinal groove and prevent the rotation thereof. As the drum shaft rotates, the nut 96 travels along the screw-threaded portion 91 and approaches the stops 94 or 95 until one of the projections 99 or 99' engages a corresponding projection on said stops and thus causes the shipper sheave to be restored to its normal position. It will therefore be seen that when the car reaches a predetermined point in its travel the accelerating switches will be restored to initial position one after another, and thereafter the reversing switch will be open and the motor stopped to effect the stopping of the car.

Obviously various changes in the details and arrangement of parts may be made by those skilled in the art without departing from the spirit and scope of our invention, and we desire therefore not to be limited to the precise construction herein disclosed. For instance, the check valve mechanism may be projected laterally from the upper portion of the dash-pot cylinder and the weight 37 replaced by a simple lever and the weight hung from the lever 34 at its upper end, or a spring may be substituted for the weight. Furthermore, a continuously transmitting connection may be used in place of the Geneva lever intermittent device, and in place of the switch being held open by cams bearing against followers such cams may be arranged to close the switches and hold the same closed when actuated in the manner hereinbefore described.

Having thus fully described our invention, what we claim and wish to have protected by Letters Patent of the United States is:—

1. The combination with an electric motor, of a reversing switch therefor, a rotary cam device for controlling said reversing switch, mechanism comprising a shaft connected to said cam device to transmit motion thereto for operating the same, accelerating switches, an additional rotary cam device mounted loosely on said shaft, means for operating said additional rotary cam device, a retarding device connected to said operating means, and a connection between the two cam devices to effect their successive operation.

2. In motor-controlling apparatus, the combination with an electric motor, of a reversing switch, cam mechanism for operating said reversing switch, one or more accelerating switches, additional cam mechanism for controlling said accelerating switches, mechanical connections between said cam mechanisms to hold the second cam mechanism in its initial position, and an intermittent actuating device connected to said first-named cam mechanism to give the same two positions, one to effect the operation of the reversing switch and the other to permit said connection to be released and thereby effect the automatic operation of said accelerating switches.

3. The combination with one or more electric switches, of cams for actuating said switches, a shaft to rotate with said cams, connections for actuating said shaft, an additional cam connected to rotate with said shaft, a cam sleeve loose on said shaft, one or more additional switches and one or more cams carried by said sleeve for actuating said switches, and automatic means normally held inoperative by said additional cam rotating with the shaft, for rotating said loose sleeve.

4. The combination with a plurality of electric switches, of cams for operating said switches, a shaft connected to said cams to cause the latter to rotate therewith, mechanism for rotating said shaft, a holding cam connected to rotate with said shaft, a cam sleeve mounted loosely on said shaft, a plurality of additional electric switches, additional cams carried by said sleeve for operating said additional switches, connections between said holding cam and the loose sleeve normally holding the latter in a predetermined position, and means for automatically rotating said loose sleeve when said holding cam releases said connections.

5. The combination with a casing, of a shaft mounted in said casing, a cam sleeve connected to said shaft to rotate therewith, a plurality of cams carried by said sleeve, electric switches operated by said cams, a holding cam, an additional sleeve with cams carried thereby mounted loosely on said shaft, additional switches operated by said last-named cams, connections between said last sleeve and said holding cam, and means for automatically rotating said loose sleeve with a retarded movement upon the release of said connections by said holding cam.

6. The combination with a rock-shaft, of a cam sleeve, a set screw for adjustably connecting said sleeve to said shaft to rotate therewith, two cams carried by said sleeve in different planes, one on one side of the sleeve and the other on the other side of the sleeve, reversing switches normally held open by said cams, springs for closing said switches when released by the cams, an additional cam sleeve mounted loosely on said rock-shaft, a series of additional cams carried by said loose sleeve, a series of accelerating switches normally held in open position by said last-named cams, additional springs for closing said accelerating switches when successively released by the cams on said loose sleeve, leverage connections between said holding cam and said loose sleeve, a weight tending to actuate said connections to rotate said loose sleeve, and a dash-pot for retarding the motion of said sleeve when said holding cam releases said connections.

7. The combination with a plurality of electric switches, of individual mechanical devices for controlling said switches, and means for simultaneously adjusting all of said devices, said devices being arranged to prevent the operation of said switches out of a predetermined order.

8. The combination with an electric motor, of starting resistance therefor, reversing switch mechanism, accelerating switches, cam mechanism for controlling said accelerating switches, and a single means for adjusting the position of said cam mechanism.

9. The combination with a rock-shaft, of mechanism for manually actuating said shaft, a set of electric switches, cam mechanism connected to rotate with said shaft to control said switches, a loose sleeve on said shaft, an additional set of electric switches, corresponding cams carried by said loose sleeve, connections between said cam mechanism and said loose sleeve preventing the latter rotating until after said cam mechanism has been operated to a predetermined position, and means for actuating said sleeve with a retarded movement to effect the operation of said cams to control said additional set of switches.

10. The combination with a rock-shaft and connections for actuating the same, of a plurality of cams connected to rotate with said shaft, electric switches controlled by said cams, a holding cam, a lever held by said last-named cam in a predetermined position, a loose sleeve on said shaft, a plurality of additional cams carried by said loose sleeve, a plurality of additional electric switches controlled by said last-named cams, actuating connections between said lever and said sleeve, a device for actuating said lever when released by said holding cam to effect the rotation of said loose sleeve to a predetermined position, and an appliance for regulating the speed of movement of said lever when released.

11. The combination with a rock-shaft, of cam mechanism operable thereby, one or more electric switches controlled by said cam mechanism, a holding cam connected to said shaft to move therewith, a lever held by said last-named cam in a predetermined position, a weight at the outer end of said lever, a loose sleeve on said shaft, one or more additional electric switches, one or more additional cams carried by said loose sleeve for controlling said last-named electric switches, motion-transmitting connections between said lever and said loose sleeve, and a dash-pot connected to said lever to retard the movement thereof when released by said holding cam and the weight actuates the same to move the loose sleeve and the cams connected thereto.

12. The combination with electric switches, of rotary cam mechanism for controlling the same, additional electric switches, additional rotary cam mechanism for controlling said additional switches and having the same axis of rotation, means for operating said first named cam mechanism, and connections between said cam mechanisms to effect the positive operation of said additional cam mechanism in one direction only.

13. In motor controlling apparatus, the combination with a reversing switch, of a rotary cam device for controlling the same, one or more accelerating switches, an additional rotary cam device for controlling said accelerating switches and arranged in axial alinement with said first named cam device, and means for preventing the operation of the accelerating switches until after the operation of the reversing switch.

14. The combination with an electric motor, of a reversing switch, a rotary cam device for controlling said reversing switch and connections for manually actuating said cam device, accelerating switches, rotary cam mechanism in line with said cam device for controlling said accelerating switches, an appliance co-acting with said cam device to hold the said cam mechanism from operating until after the reversing switch has been operated, and means for retarding the motion of said cam mechanism.

15. The combination with an electric motor, of a rotary cam device, a reversing switch controlled by said device, accelerating switches, a second rotary cam device in axial alinement with said first named cam device, connections acted upon by the first named device to initially hold said second cam device in inoperative position, and appliances to automatically actuate said second rotary device.

16. The combination with a pair of oppositely disposed switches, of a single means for holding the switches in closed position, a device operable to positions for holding either one or both of the switches open in opposition to said means, and means for operating said device to effect the successive closing of the switches.

17. In controlling mechanism, the combination with a plurality of switches, of a cam device operable to effect the successive operation of the switches, a rotary element, and mechanism between said element and said device for effecting the intermittent operation of the latter when the said element is rotated.

18. In controlling mechanism, the combination with a plurality of switches, of a cam device for controlling the operation of the switches, and manually operable means for automatically effecting an intermittent operation of said device.

19. In controlling mechanism, the combination with a plurality of switches, of a rotary device for effecting a successive operation of the switches, a manually operable device, and mechanism between said devices for changing the continuous operation of one into intermittent operation of the other.

20. The combination with a rock shaft, of cams carried thereby, switches controlled by said cams, a sleeve loosely mounted on the rock shaft, cams on said sleeve, switches controlled by said last named cams, an additional cam carried by the rock shaft, and mechanism between said additional cam and said sleeve for controlling the operation of the latter.

21. The combination with a rotary cam device comprising a plurality of cams, of a switch controlled by one of said cams, a second rotary cam device in axial alinement with said first named device, a switch controlled by said second device, and mechanism connecting a second cam on said first named device with said second named cam device and preventing the operation of the latter during the initial movement of the first named cam and permitting the operation of the second cam device when the first device has operated through a predetermined distance.

22. In controlling mechanism, the combination with a plurality of rotary cams in axial alinement, means to operate one of said cams, additional means to operate the other cam, a mechanical device to prevent the operation of the second named cam during the initial operation of the first named cam, and switches controlled by said cams.

23. The combination with a plurality of rotary cam devices arranged in axial alinement, switches controlled by said devices, means for operating one of said devices, mechanism for preventing the operation of the other device during the initial rotation of the first cam device, and means for operating the second cam device after the initial movement of the first named device, said mechanism effecting the positive return of the second cam device when the first cam device is returned to initial position.

In testimony whereof, we have signed our names to this specification in the presence of two subscribing witnesses.

DAVID L. LINDQUIST.
DAVID LARSON.

Witnesses:
CHAS. M. NISSEN,
JAMES G. BETHELL